UNITED STATES PATENT OFFICE.

WILLIAM MORRISON, OF DES MOINES, IOWA.

SECONDARY-BATTERY ELECTRODE AND PROCESS OF MAKING THE SAME.

1,175,370.     Specification of Letters Patent.     Patented Mar. 14, 1916.

No Drawing.     Application filed September 11, 1914. Serial No. 861,271.

*To all whom it may concern:*

Be it known that I, WILLIAM MORRISON, a citizen of the United States, residing at Des Moines, in the county of Polk and State of Iowa, have invented certain new and useful Improvements in Secondary-Battery Electrodes and Processes of Making the Same, of which the following is a specification.

This invention relates to the production of secondary battery electrodes, and has for its object to produce an electrode that is more durable in use and possesses a longer life than is obtained from electrodes in general use at this time.

To make an improved electrode according to this invention, lead battery electrodes of any of the usual types, are placed in a sulfuric acid electrolyte of about 1.250 specific gravity, containing dissolved therein a titanium compound, for example titanic acid, in greater or less amount, the per cent. of titanium compound present not being a determined factor; the electrodes are then acted upon therein by an electric current, charging and discharging several times, if necessary. During this treatment, the electrodes take up some titanium from the electrolyte and form a combination therewith not at present understood, but which materially affects their durability and life. As the result of this treatment the electrodes are superficially permeated with a titanium compound, to a greater or less depth. The electrodes are now removed, either in a charged or discharged condition, and placed in a sulfuric acid electrolyte of the usual specific gravity, and are ready for use.

I claim:—

1. A lead secondary battery electrode superficially permeated with a titanium compound.

2. The process of treating secondary battery electrodes, which comprises acting thereupon with an electric current while in contact with an acid electrolyte containing a titanium compound dissolved therein.

3. The process of treating secondary battery electrodes, which comprises acting thereupon with an electric current while in contact with a sulfuric acid electrolyte containing titanic acid dissolved therein.

In testimony whereof I affix my signature in presence of two witnesses.

WILLIAM MORRISON.

Witnesses:
    JOSEPH W. HARRIS,
    J. H. BRICKENSTEIN.